Figure 1:
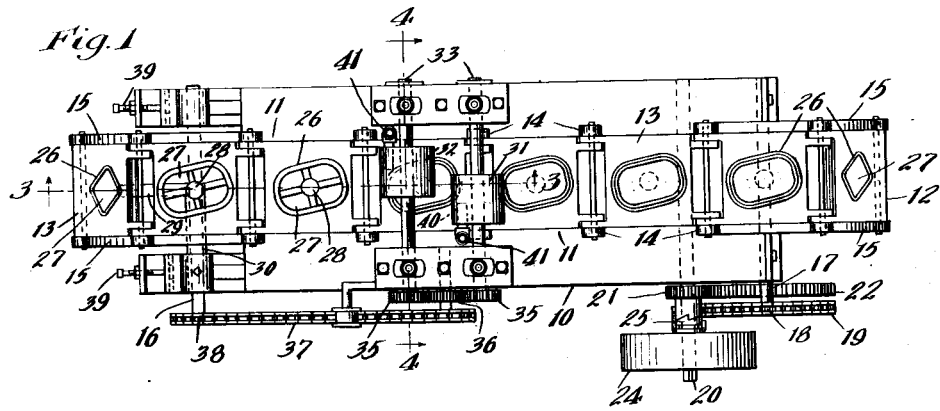
Figure 2:
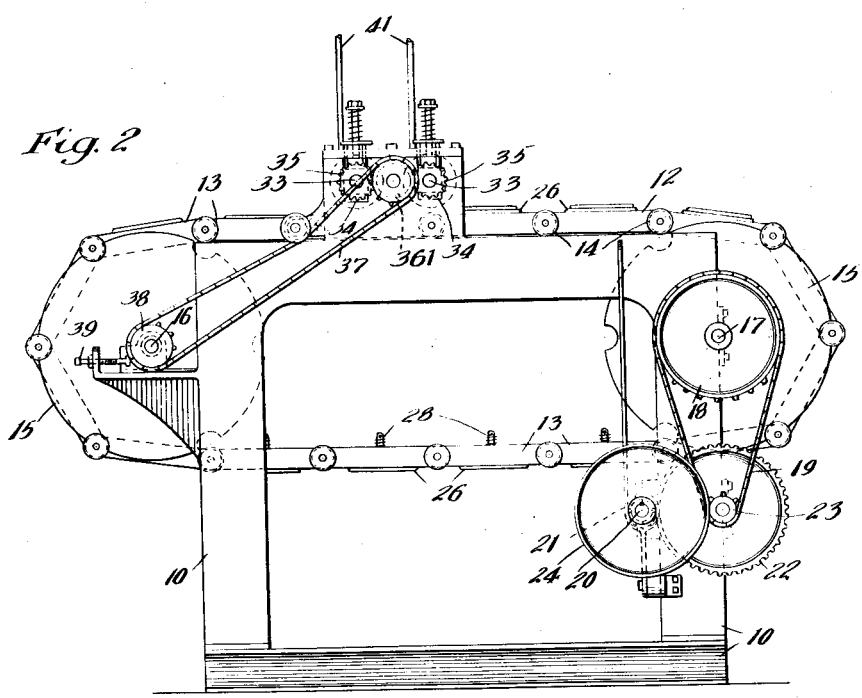

W. E. TAYLOR.
SOLDER FUSING MACHINE.
APPLICATION FILED OCT. 23, 1911.

1,051,647.

Patented Jan. 28, 1913.

2 SHEETS—SHEET 1.

Witnesses:

Inventor:
William E. Taylor
By Munday, Evarts, Adcock & Clarke,
Attys.

W. E. TAYLOR.
SOLDER FUSING MACHINE.
APPLICATION FILED OCT. 23, 1911.
1,051,647.
Patented Jan. 28, 1913.
2 SHEETS—SHEET 2.
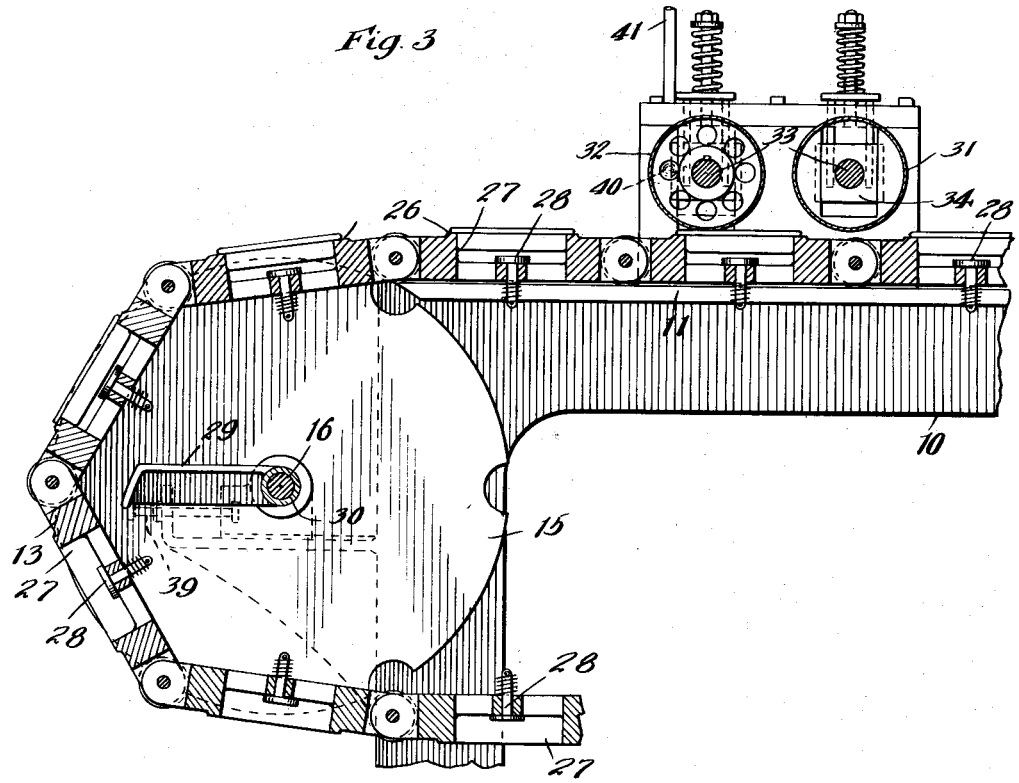
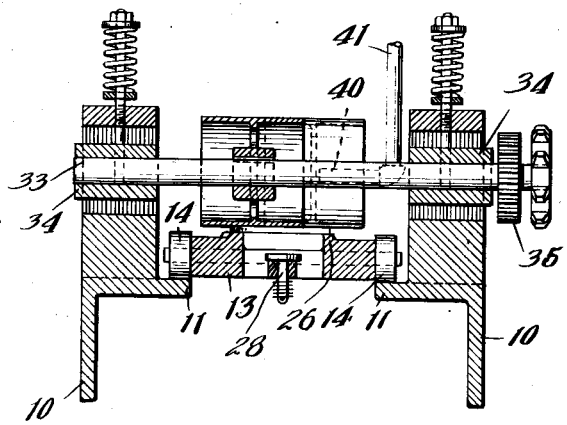
Witnesses:
Inventor:
William E. Taylor
By Munday, Evarts, Adcock & Clark.
Attys.

UNITED STATES PATENT OFFICE.

WILLIAM E. TAYLOR, OF EASTPORT, MAINE, ASSIGNOR TO AMERICAN CAN COMPANY, OF NEW YORK, N. Y., A CORPORATION OF NEW JERSEY.

SOLDER-FUSING MACHINE.

1,051,647.   Specification of Letters Patent.   Patented Jan. 28, 1913.

Application filed October 23, 1911.   Serial No. 656,209.

*To all whom it may concern:*

Be it known that I, WILLIAM E. TAYLOR, a citizen of the United States, residing in Eastport, in the county of Washington and State of Maine, have invented a new and useful Improvement in Solder-Fusing Machines, of which the following is a specification.

This invention relates to improvements in solder fusing machines.

The object of my invention is to provide a machine which is particularly adapted for fusing the seams of sardine or rectangular cans, and the improvements relate more specifically to the arrangement of the combined fusing and pressing rollers.

In forming solder seams on filled cans, one of the most essential requisites is that as little heat as possible be transmitted to the can body or to the contents of the same in order to prevent expansion of the air already in the can, or the formation of other gases, both of which sometimes cause leaks or the formation of pin holes in the seam during the cooling or setting of the solder as the gases escape under pressure. The expanded gases furthermore tend to weaken the seam by forcing the cover off.

Several methods have been employed to overcome these objections which have been more or less successful, such, for instance, as that disclosed in the patent issued to Wassman and Widell, No. 975912, dated Nov. 15, 1910, wherein the seams are fused and set progressively by means of a heating roller extending entirely across the can and completing the seam in a single operation. By experiment, I have found that better and more uniform results are obtained by fusing the seam in two or more operations, or, in other words, progressively forming the joint on different sections of the can seam at different times, and allowing the solder to progressively set in each portion before the next or adjoining portion is progressively fused and set, it being understood that these sections slightly overlap in order to secure a complete seam. In this way during the first part of the operation where the fusing is done in two sections, substantially one half of the seam is open and allows any expanded or new formed gases to easily escape while half of the seam is being formed, and there is no tendency to form pin holes in the portion of the seam being fused, and furthermore there is less tendency to heat the can body and its contents when the heating or fusing roller extends only over a portion of the can. Because of the great amount of radiating surface, and the small amount of metal to retain the heat, that portion of the can which is heated at the first operation is practically cold by the time that it reaches the second fusing roller. During the final fusing or sealing of the can by my method, there is less tendency to heat the can and its contents because of the less area covered by the heating roller than if the roller extended entirely across the can, and consequently the expansion and formation of gases within the can is less, which results in fewer leaks and pin holes. Another advantage gained by fusing the seam in several steps where a rectangular can is operated upon diagonally, as is preferable, is that the solder at the corner last fused and the corner at which there is the greatest tendency for the formation of pin holes, is fused twice, thus removing any pin holes that may have been formed during the first fusing step.

The object of my invention is to provide a simple, efficient and durable machine by which the foregoing operations may be carried out, and the machine which I have shown preferably comprises a lower pressure device which, as shown, is in the form of an endless conveyer composed of a plurality of die blocks, combined fusing and pressing rollers disposed along the line of travel of the cans as they are advanced by the conveyer, each of said rollers extending only over a portion of the cans, and in the case where two are used, each of said rollers extends to one side of the diagonal of the rectangular can bodies and also slightly overlaps in order to secure a perfect seam. It will be understood that more than two rollers may be used, and that various modifications and changes may be made in the structure shown, without departing from the spirit of my invention.

My invention further consists in the improvements in the parts and devices and in the combinations of parts and devices herein shown, described and claimed.

In the drawings forming a part of this specification, Figure 1 is a plan view of a machine embodying my improvements. Fig.

2 is a side elevation of the structure shown in Fig. 1. Fig. 3 is a longitudinal, partial vertical section, taken on the line 3—3 of Fig. 1, looking in the direction of the arrows, and Fig. 4 is a transverse vertical section, taken on the line 4—4 of Fig. 1, and looking in the direction of the arrows.

In the drawings, 10 represents any suitable frame structure adapted to support the various operating mechanisms. The top of the frame 10 is provided with two horizontal tracks 11, on which is adapted to move the endless conveyer 12 comprised of die-block links 13, and preferably provided with rollers 14. The conveyer or lower pressure device is carried by the sprocket gears 15 mounted at each end of the frame on shafts 16 and 17, and rigidly keyed to the shaft 17 is a sprocket gear 18, rotated by means of a chain 19, driven from the power shaft 20 by means of interposed gears 21, 22 and 23, the gears 22 and 23 being keyed to the same shaft, and the chain 19 being operated by the gear 23. A suitable driving pulley 24 and a clutch 25 are mounted on the shaft 20 to transmit power thereto. Each of the die block links 13 is provided with a raised pressure surface 26, corresponding in shape to the seam of the can being fused and extending entirely around the can, and it will of course be understood that these raised portions 26 also act as heat radiating or cooling devices for the fused can body seams. The links or die blocks 13 are provided also with recesses 27 in which the cans are adapted to be seated. Each of the links 13 is furthermore provided with a knock out or ejector 28, adapted to be operated by a stationary cam 29 mounted, by means of a sleeve 30 on the shaft 16.

In fusing rectangular or sardine cans, as previously stated, it is preferable to arrange the cans so as to present them diagonally or crosswise to the fusing and pressure rollers, as shown more particularly in Fig. 1. Disposed above the conveyer 12 are two combined pressure and fusing rollers 31 and 32, mounted on parallel, horizontal axes 33 mounted in adjustable spring pressed bearings 34, said shafts and the rollers keyed thereto being positively driven by means of gears 35 thereon, said gears 35 being rotated by an intermediate gear 36 carrying a sprocket 361, driven by means of a chain 37 passing over a sprocket gear 38 on the shaft 16, said shaft 16, as more clearly shown in Fig. 1 being adjustably mounted, as by means of set screws 39. As shown in Fig. 1, the greater portion of the roller 31 extends to one side of the line connecting the central points of the can pockets, and the greater portion of the roller 32 extends to the opposite side of said line, the rollers 31 and 32 being extended sufficiently to the opposite sides of said line to insure a fusing of the entire seam. Each of the combined pressure and fusing rollers is heated preferably by means of gas jets 40 supplied by gas pipes 41.

In operation, the roller 31 progressively fuses the seam to one side of the diagonal of the can and the fused portions progressively set and are practically cool before the can body reaches the second roller 32, where the same operations are performed on the other or remaining portion of the seam, and the cans, upon reaching a vertical position at the end of the machine are ejected by the knockouts 28 which are engaged by the cam 29.

I claim :—

1. In a soldering machine, the combination with spaced, heated pressure devices, each adapted to operate on a different section of the seam, said sections slightly overlapping and forming the whole of the area of the seam to be soldered, of an opposing cooling pressure device adapted to coöperate with each of the heated pressure devices, whereby a part of the seam is fused by one of the heated pressure devices and another part by another heated pressure device, substantially as specified.

2. In a soldering machine, the combination with spaced heated pressure rollers each adapted to operate on a different section of the seam, said sections slightly overlapping and forming the whole of the area of the seam to be soldered, of an opposing cooling pressure device adapted to coöperate with each of the rollers, said cooling pressure device corresponding in shape to and adapted to contact with the seam throughout the extent thereof, substantially as specified.

3. In a soldering machine, the combination with two spaced heated pressure rollers, each adapted to operate on a different portion of the seam, said portions slightly overlapping and forming the whole of the area of the seam to be soldered, of an opposing cooling pressure device movable under said rollers, substantially as specified.

4. In a soldering machine, the combination with spaced heated fusing rollers, each adapted to fuse the solder on different portions of the seam at different times, said portions slightly overlapping and forming the whole of the area of the seam to be soldered, of a can body conveyer adapted to convey can bodies successively under each fusing roller whereby the portion of the seam fused by one roller sets before the can body is passed under the next roller, substantially as specified.

5. In a soldering machine, the combination with two spaced, positively driven heated pressure rollers, each adapted to act on different sections of the seam at different times, said sections slightly overlapping and forming the whole of the area of the seam to be soldered, of a can body conveyer provided with a plurality of opposing cooling pressure devices each conforming in shape to the seam and contacting therewith throughout its extent, said conveyer being adapted to move the can bodies successively beneath the pressure rollers, substantially as specified.

6. In a soldering machine, the combination with two spaced, heated fusing rollers, each adapted to act on a different section of the seam at different times, said sections slightly overlapping and forming the whole of the area of the seam to be soldered, of an endless die block can body conveyer, said rollers being positively driven and adjustably mounted in spring pressed bearings, substantially as specified.

7. In a soldering machine, the combination with two hollow gas flame heated pressure rollers mounted on parallel spaced axes, of a can body conveyer movable under said rollers, said conveyer being provided with diagonally arranged rectangular can body pockets, said rollers each having a greater portion thereof extended one to one side and the other to the opposite side of a line connecting the centers of the can body pockets as they are passed under the rollers, substantially as specified.

8. In a soldering machine, the combination with supporting tracks and an endless die block carrier, of two spaced, heated pressure rollers, said rollers being mounted on parallel axes and out of alinement, whereby each roller operates on a different section of the seam at different times, said sections slightly overlapping and forming the whole of the area of the seam to be soldered, and the section first fused is allowed to set before the remaining section is fused, means for operating the carrier and means for positively driving the rollers, substantially as specified.

9. In a machine for soldering the cover seams on rectangular cans, the combination with spaced, heated pressure rollers, of an opposing cooling pressure device adapted to engage and support the can and pass it diagonally or cornerwise under said heated rollers, said rollers being so positioned that each operates substantially on a different section of the can seam to one side of a diagonal of the can, said sections slightly overlapping and forming the whole of the area of the seam to be soldered, substantially as specified.

WILLIAM E. TAYLOR.

Witnesses:
WILLIAM J. WILSON,
ETHEL E. FERSON.